United States Patent
Noetzel et al.

(10) Patent No.: US 6,974,646 B2
(45) Date of Patent: *Dec. 13, 2005

(54) SOLID-OXIDE FUEL CELL ASSEMBLY HAVING AN ELECTRONIC CONTROL UNIT WITHIN A STRUCTURAL ENCLOSURE

(75) Inventors: John G. Noetzel, Fairport, NY (US); Karl J. Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/178,870

(22) Filed: Jun. 24, 2002

(65) Prior Publication Data

US 2003/0235727 A1    Dec. 25, 2003

(51) Int. Cl.$^7$ .......................... H01M 8/04; H01M 2/02; H01M 2/06
(52) U.S. Cl. ............................. 429/34; 429/19; 429/22; 429/38
(58) Field of Search ............................. 429/22, 30, 34, 429/38, 12, 19; 180/65.1

(56) References Cited

U.S. PATENT DOCUMENTS

| | | |
|---|---|---|
| 6,321,145 B1 | 11/2001 | Rajashekara |
| 6,423,896 B1 | 7/2002 | Keegan |
| 6,428,918 B1 | 8/2002 | Fuglevand et al. |
| 6,455,185 B2 | 9/2002 | Bircann et al. |
| 6,485,852 B1 | 11/2002 | Miller et al. |
| 6,509,113 B2 | 1/2003 | Keegan |
| 6,551,734 B1 | 4/2003 | Simpkins et al. |
| 6,562,496 B2 | 5/2003 | Faville et al. |
| 6,562,502 B2 * | 5/2003 | Haltiner, Jr. .................. 429/25 |
| 6,608,463 B1 | 8/2003 | Kelly et al. |
| 6,613,468 B2 | 9/2003 | Simpkins et al. |
| 6,613,469 B2 | 9/2003 | Keegan |
| 6,627,339 B2 | 9/2003 | Haltiner, Jr. |
| 6,630,264 B2 | 10/2003 | Haltiner, Jr. et al. |
| 2001/0049035 A1 | 12/2001 | Haltiner, Jr. |
| 2001/0053465 A1 | 12/2001 | Fuglevand |
| 2002/0025458 A1 | 2/2002 | Faville et al. |
| 2002/0081471 A1 | 6/2002 | Keegan et al. |
| 2003/0235725 A1 * | 12/2003 | Haltiner et al. ................ 429/19 |

FOREIGN PATENT DOCUMENTS

| | | |
|---|---|---|
| EP | 1 231 659 A2 | 8/2002 |
| EP | 1 233 468 A 2 | 8/2002 |
| JP | 2002056864 | 2/2002 |

OTHER PUBLICATIONS

Merriam-Webster's Collegiate Dictionary, 10$^{th}$ ed., p. 354. 1998, no month.
European Search Report dated Jan. 8, 2004 for EP Ser. No. 03 07 6800.

* cited by examiner

Primary Examiner—Tracy Dove
(74) Attorney, Agent, or Firm—Paul L. Marshall

(57) ABSTRACT

In a solid-oxide fuel cell system, the electronic control unit which measures and controls temperatures, pressures, valve sequencing, valve positioning, blower power, electric output, and flows of air and fuel gas, is disposed in a "cool zone" within a structural housing. Electric leads from the control unit to the individual system components therefore do not pass through the housing. The few leads from the control unit required for connection of the fuel cell system to a load are gathered into a single electrical connector mounted through a wall of the structural enclosure.

15 Claims, 15 Drawing Sheets

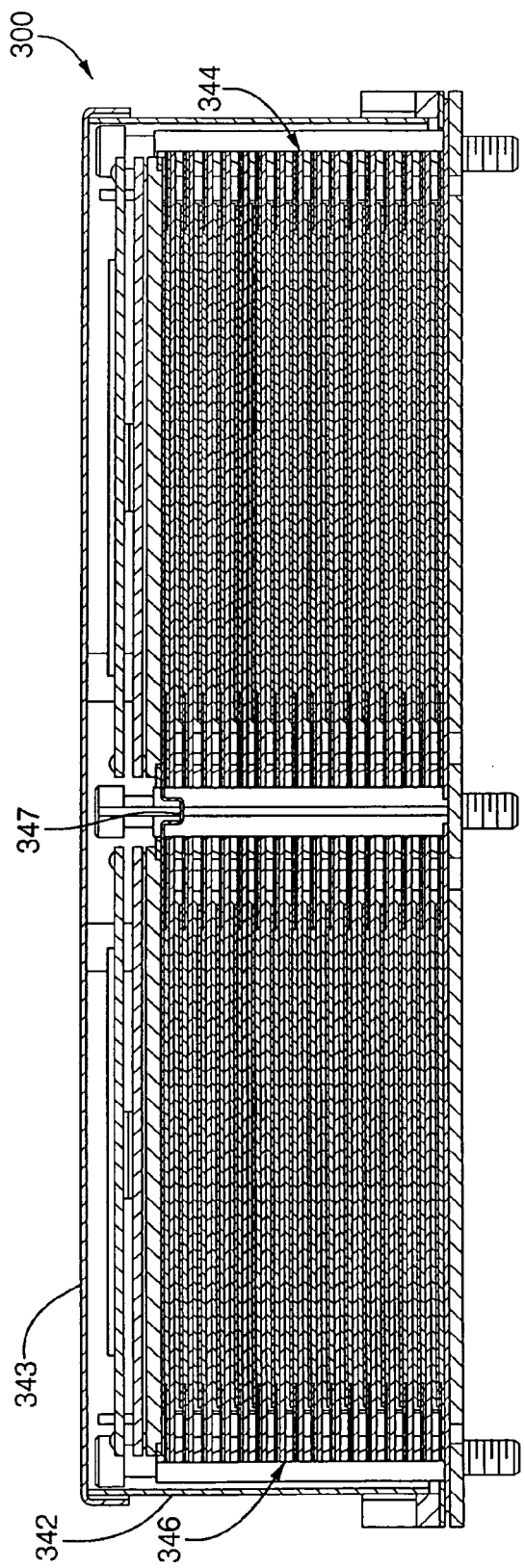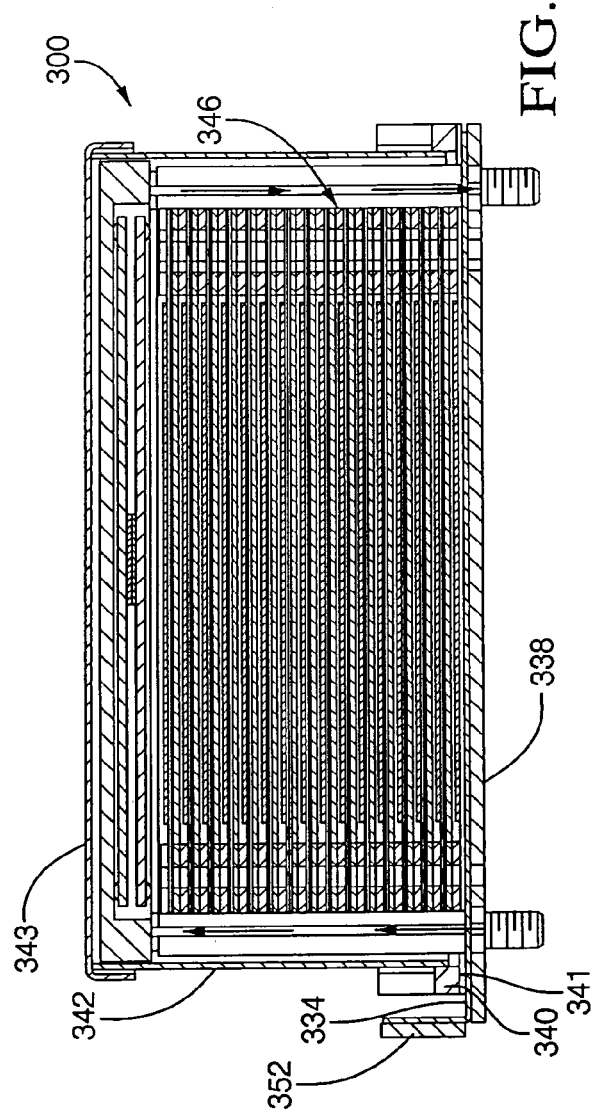
FIG. 5
FIG. 6

SOLID-OXIDE FUEL CELL ASSEMBLY HAVING AN ELECTRONIC CONTROL UNIT WITHIN A STRUCTURAL ENCLOSURE

TECHNICAL FIELD

The present invention relates to hydrogen/oxygen fuel cells having a solid-oxide electrolytic layer separating an anode layer from a cathode layer; more particularly, to a fuel cell system wherein core components which operate at very high temperatures in a hot zone are contained in a thermal enclosure disposed within a separate and larger structural enclosure; and most particularly to such a fuel cell system wherein an electronic control system for controlling the fuel cell system is disposed within the structural enclosure.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells. Because each anode and cathode must have a free space for passage of gas over its surface, the cells are separated by perimeter spacers which are selectively vented to permit flow of gas to the anodes and cathodes as desired but which form seals on their axial surfaces to prevent gas leakage from the sides of the stack. The perimeter spacers may include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack.

An enclosure for a fuel cell system has two basic functions. The first is to provide thermal insulation for some of the components which must function at an elevated temperature (700–900° C.) to maintain them at that temperature for efficient operation, to protect lower temperature components, and to reduce the exterior temperature over the overall unit to a human-safe level. The second is to provide structural support for mounting of individual components, mounting the system to another structure such as a vehicle, protection of the internal components from the exterior environment, and protection of the surrounding environment from the high temperatures of the fuel cell assembly. Prior art fuel cell systems utilize a single enclosure to provide all functions, which can be complex and costly to fabricate and assemble, and consumptive of space.

Further, prior art fuel cell systems typically have an electronic control system disposed outside the structural enclosure. This makes assembly of the fuel cell system complex and expensive, and makes the finished fuel cell system unwieldy because of the many electrical leads which must pass through the structural enclosure between the control system and a large number of sites throughout the system for measuring and/or controlling inter alia temperatures, pressures, valve sequencing, valve positioning, blower power, electric output, and mass flows of air and fuel gas. This ungainliness fails to integrate the control system structurally into the fuel cell system such that the system can function easily and reliably as an independent auxiliary power unit (APU).

What is needed is a means for minimizing and grouping the number of leads which must pass through the structural enclosure of a fuel cell system.

It is a principal object of the present invention to simplify the construction of a solid-oxide fuel cell system, reduce its cost and size, and improve its overall integrity as a stand-alone APU.

It is a further object of the invention to increase the reliability and safety of operation of such a fuel cell system.

BRIEF DESCRIPTION OF THE INVENTION

Briefly described, in a solid-oxide fuel cell system, the electronic control unit which measures and controls temperatures, pressures, valve sequencing, valve positioning, blower power, electric output, and mass flows of air and fuel gas, is disposed in a "cool zone" within a structural housing. Electric leads from the control unit to the individual system components therefore do not pass through the housing. The few leads from the control unit required for use of the fuel cell system are gathered into a single electrical connector and two high current capacity power leads mounted through a wall of the structural enclosure.

BRIEF DESCRIPTION OF THE DRAWINGS

These and other features and advantages of the invention will be more fully understood and appreciated from the following description of certain exemplary embodiments of the invention taken together with the accompanying drawings, in which:

FIG. 5 is an elevational cross-sectional view taken along line 5—5 in FIG. 4;

FIG. 6 is an elevational cross-sectional view taken along line 6—6 in FIG. 4;

DESCRIPTION OF THE PREFERRED EMBODIMENTS

Figure 1:
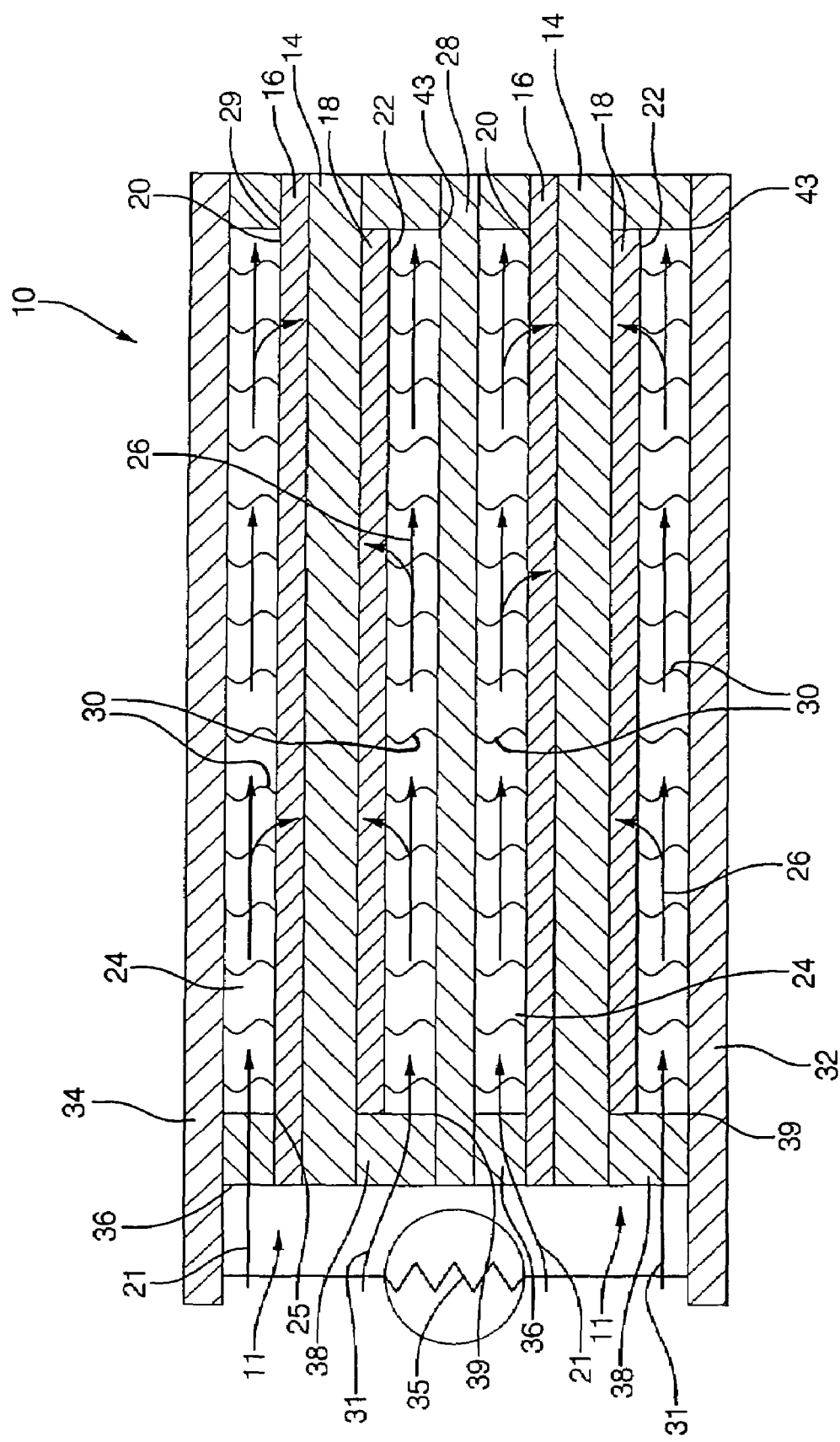
FIG. 1 is a schematic cross-sectional view of a two-cell stack of solid oxide fuel cells.

Referring to FIG. 1, a fuel cell stack 10 includes elements known in the art of solid-oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of one fuel cell 11 faces and is electrically connected to an interconnect 28 by filaments 30 extending across but not blocking passageway 24. Similarly, cathode 18 of fuel cell 11 faces and is electrically connected to interconnect 28 by filaments 30 extending across but not blocking passageway 26. Similarly, cathode 18 of a second fuel cell 11 faces and is electrically connected to a cathodic current collector 32 by filaments 30 extending across but not blocking passageway 26, and anode 16 of fuel cell 11 faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way as to yield the desired height of the anode passageways 24 and cathode passageways 26.

Preferably, the interconnect and the current collectors are formed of an alloy, typically a "superalloy," which is chemically and dimensionally stable at the elevated temperatures necessary for fuel cell operation, generally about 750° C. or higher, for example, Hastelloy, Haynes 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ anions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells 11 are connected in series electrically between the two current collectors, and the total voltage and wattage between the current collectors is the sum of the voltage and wattage of the individual cells in a fuel cell stack.

Figure 2:
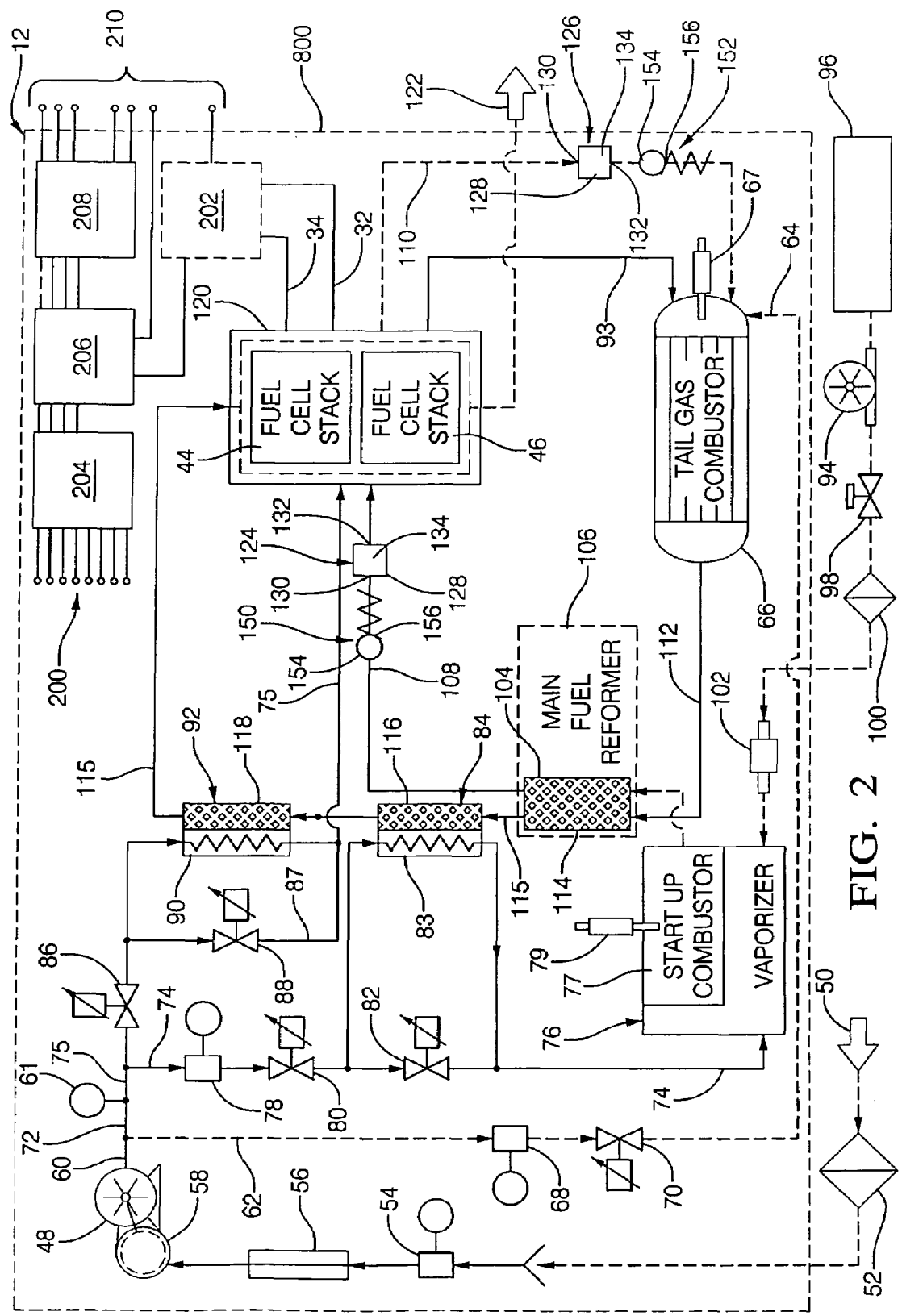
FIG. 2 is a schematic mechanization diagram of an SOFC system in accordance with the invention.
Figure 3:
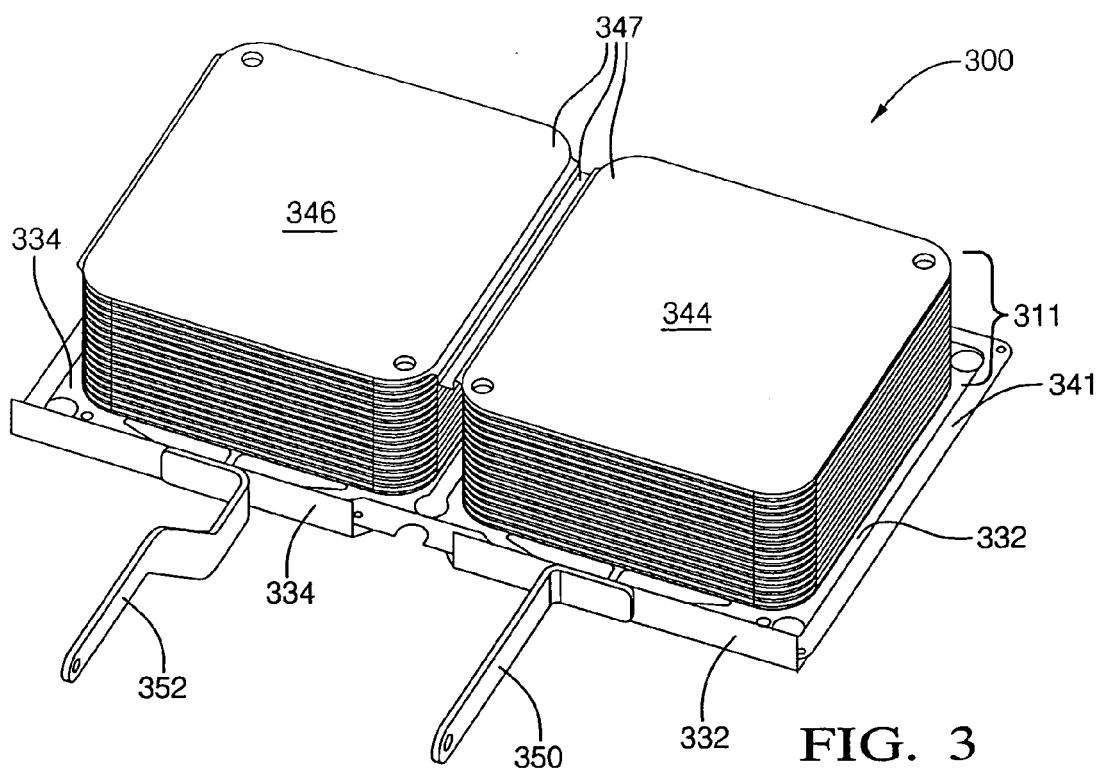
FIG. 3 is an isometric view from above of a two-stack fuel cell assembly, shown connected electrically in series between two current collectors.
Figure 4:
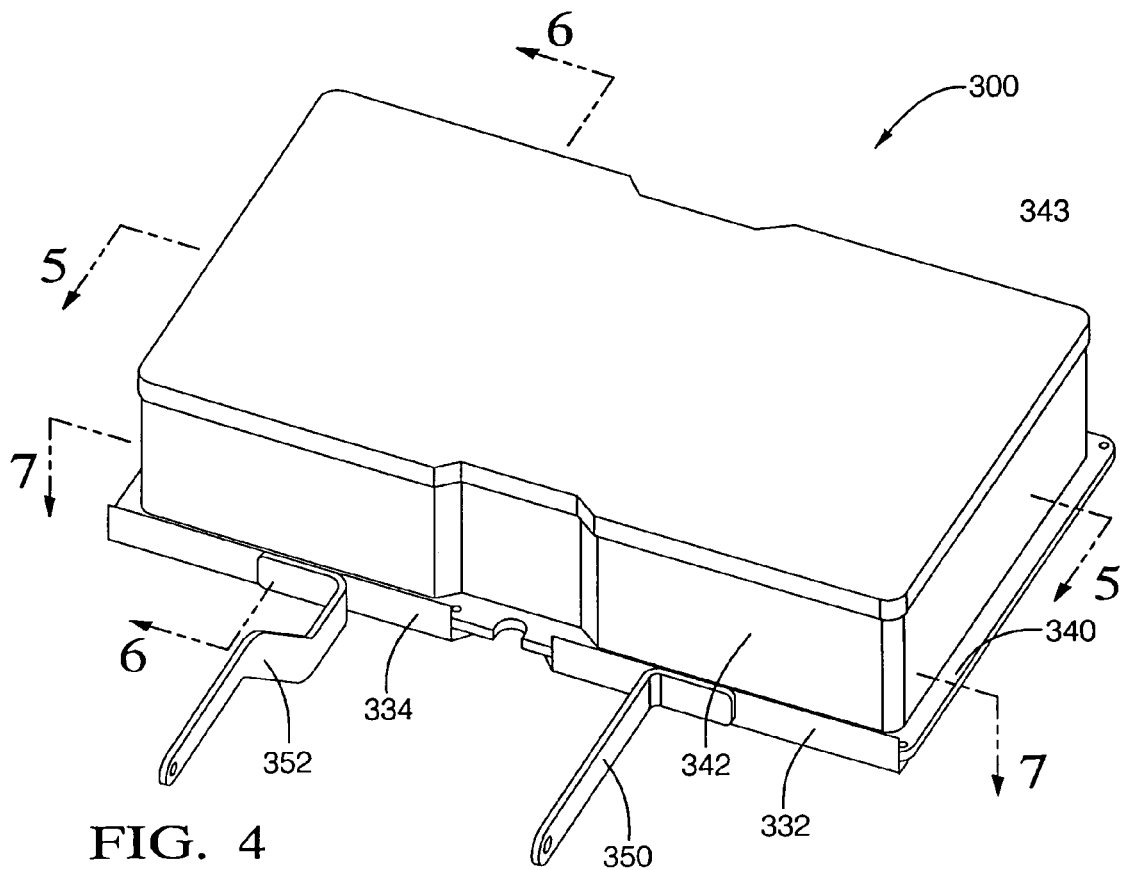
FIG. 4 is an isometric view like that shown in FIG. 3, with a cover enclosing the stacks.
Figure 7:
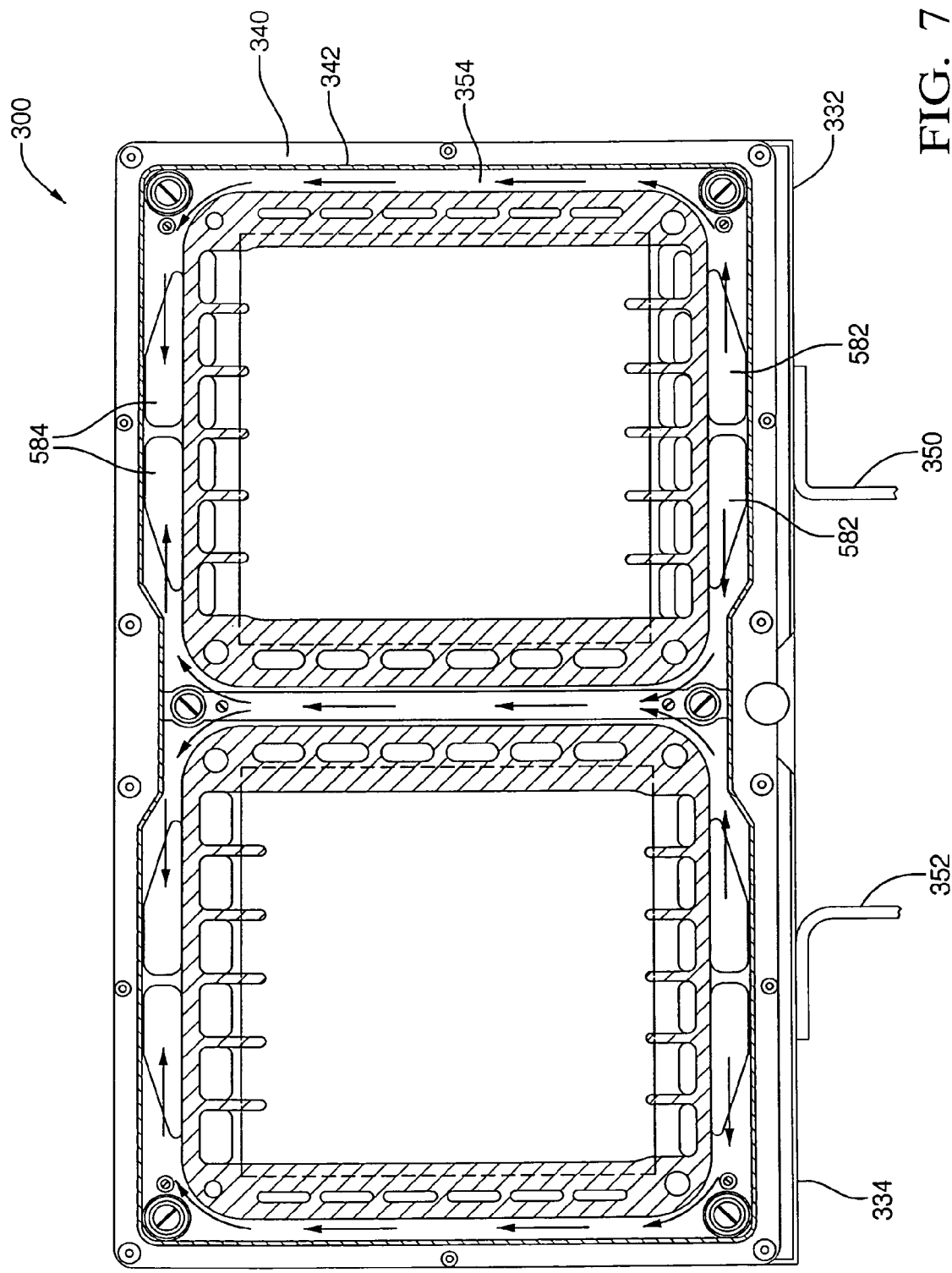
FIG. 7 is an equatorial cross-sectional view taken along line 7—7 in FIG. 4.

Referring to FIG. 2, a schematic mechanization diagram of a solid-oxide fuel cell system 12 in accordance with the invention includes auxiliary equipment and controls.

A conventional high speed inlet air pump 48 draws inlet air 50 through an air filter 52, past a first MAF sensor 54, through a sonic silencer 56, and through a cooling shroud 58 surrounding pump 48.

Air output 60 from pump 48, at a pressure sensed by pressure sensor 61, is first split into branched conduits between a feed 62 and a feed 72. Feed 62 goes as burner cooling air 64 to a tail gas afterburner 66 having an igniter 67 via a second MAF sensor 68 and a burner cool air control valve 70.

Feed 72 is further split into branched conduits between an anode air feed 74 and a cathode air feed 75. Anode feed 74 goes to a hydrocarbon fuel vaporizer 76 via a third MAF sensor 78 and reformer air control valve 80. A portion of anode air feed 74 may be controllably diverted by control valve 82 through the cool side 83 of reformate pre-heat heat exchanger 84, then recombined with the non-tempered portion such that feed 74 is tempered to a desired temperature on its way to vaporizer 76. Downstream of vaporizer 76 is a start-up combustor 77 having an igniter 79. During start-up, when the reformer is cold or well below operating temperature, vaporized fuel is ignited in combustor 77 and the burned gas is passed directly through the reformer to warm the plates therein more rapidly. Obviously, the start-up combustor is deactivated during normal operation of the system.

Cathode air feed 75 is controlled by cathode air control valve 86 and may be controllably diverted by cathode air preheat bypass valve 88 through the cool side 90 of cathode air pre-heat heat exchanger 92 on its way to stacks 44,46. After passing through the cathode sides of the cells in stacks 44,46, the partially spent, heated air 93 is fed to burner 66.

A hydrocarbon fuel feed pump 94 draws fuel from a storage tank 96 and delivers the fuel via a pressure regulator 98 and filter 100 to a fuel injector 102 which injects the fuel into vaporizer 76. The injected fuel is combined with air feed 74, vaporized, and fed to a reformer catalyst 104 in main fuel reformer 106 which reforms the fuel to, principally, hydrogen and carbon monoxide. Reformate 108 from catalyst 104 is fed to the anodes in stacks 44,46. Unconsumed fuel 110 from the anodes is fed to afterburner 66 where it is combined with air supplies 64 and 93 and is burned. When gases are below self-ignition temperature, they are ignited by igniter 67. The hot burner gases 112 are passed through a cleanup catalyst 114 in main reformer 106. The effluent 115 from catalyst 114 is passed through the hot sides 116,118 of heat exchangers 84, 92, respectively, to heat the incoming cathode and anode air. The partially-cooled effluent 115 is fed to a manifold 120 surrounding stacks 44,46 from whence it is eventually exhausted 122.

Still referring to FIG. 2, a first check valve 150 and a first oxygen getter device 124 are provided in the conduit feeding reformate 108 to the anodes (not visible) in stacks 44,46. A second check valve 152 and second oxygen getter device 126 are similarly provided in the conduit feeding spent reformate 110 from the anodes to afterburner 66. As described above, during cool-down of the fuel cell stacks after shut-down of the assembly, it is important to prevent migration of oxygen into anode passages 24 wherein anode surface 20, comprising metallic nickel, would be subject to damaging oxidation. Each check valve includes a typical frusto-conical valve seat 154 receptive of a valve ball 156. Preferably, each valve 150,152 is oriented within assembly 12 such that the ball is held in the seat by gravity when reformate is flowed through the system in the forward direction. Thus, fuel flow opens the valve sufficiently for fuel to pass in the forward direction. When assembly 12 is shut down, each valve is closed by gravity. The valves may not be identical, as oxygen flows opposite to the reformate in valve 152, but in the same direction as the reformate in valve 150; the so the balls and seats may require different weights and/or sizes to function as intended. Each getter 124,126 includes a passageway 128 having an inlet 130 and an outlet 132 through which reformate is passed during operation of the fuel cell assembly. Within the passageway is a readily-oxidized material 134 (oxygen-reducing means), for example, nickel metal foam, nickel wire or nickel mesh, which is capable of gettering oxygen by reaction therewith but which does not present a significant obstruction to flow of reformate through the passageway. Nickel in the getters reacts with oxygen to produce nickel oxide, NiO, when the assembly is shut down, thus protecting the nickel-containing anodes from oxidation. When the assembly is turned back on, reformate is again produced which, in passing through the getters, reduces the NiO back to metallic nickel, allowing the getters to be used repeatedly.

For clarity of presentation and to enhance the reader's understanding, the numbers of elements of the invention as presented further below are grouped in century series depending upon the functional assembly in which the elements occur; therefore, elements recited above and shown in FIGS. 1 and 2 may have different numerical designators when shown and discussed below, e.g., stacks 44,46 become stacks 344,346.

Referring to FIGS. 3 through 7, in a fuel cell stack assembly 300 in accordance with the invention, the cells 311 are arranged side-by-side and may comprise a plurality of cells 311, respectively, such that each of first stack 344 and second stack 346 is a stack of identical fuel cells 311. The plurality of cells is preferably about 30 in each of the two stacks. The cells 311 in stack 344 and stack 346 are connected electrically in series by interconnect 347, and the stacks are connected in series with cathode current collector 332 and anode current collector 334 on the bottom of the stacks. The current collectors are sized to have a "footprint" very close to the same dimension as a cover-sealing flange 340. The current collectors preferably are adhesively sealed to a stack mounting plate 338, and the stacks preferably are in turn adhesively sealed to the current collectors. The sealing flange 340 for the cover 342 and top 343 is then mounted and sealed to the current collector plates. A gasket 341 between flange 340 and the current collectors is a dielectric so that flange 340 does not cause a short between the current collectors. Power leads 350,352 are attached to current collectors 332,334, respectively, through strong, reliable and highly conductive metallurgical bonds, such as brazing. In this manner, the current collectors may pass under the cover mounting flange 340, with no additional sealing or power lead attachment required, and do not have to pass undesirably through the cover itself, as in some prior art stack assemblies. Passing leads through the cover makes the assembly more complex and less reliable.

Figure 8:
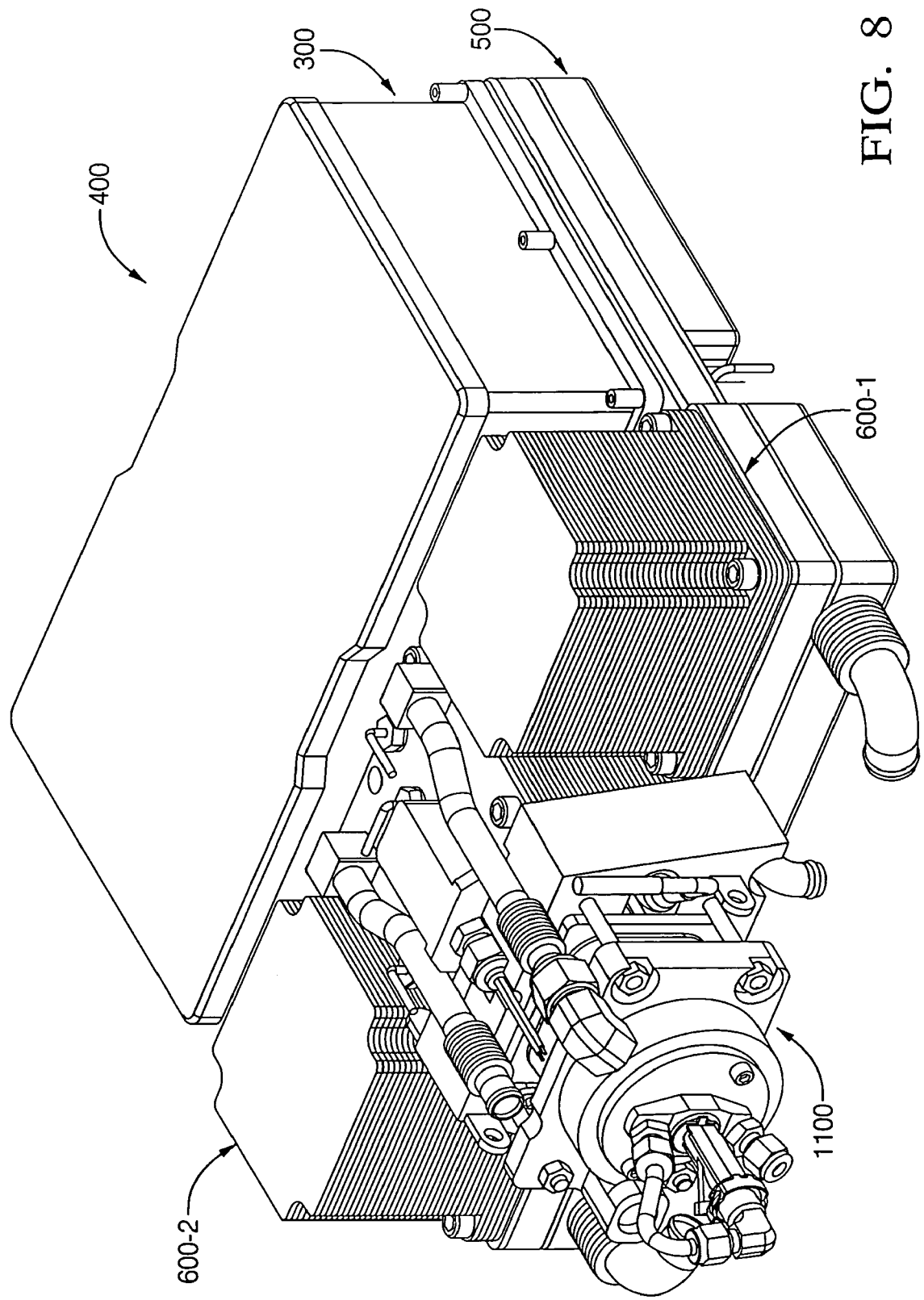
FIG. 8 is an isometric view from above, showing a fuel cell assembly comprising the apparatus of FIG. 4 mounted on a manifold in accordance with the invention, along with reforming, combusting, and heat exchanging apparatus for servicing the fuel cell stacks.
Figure 10:
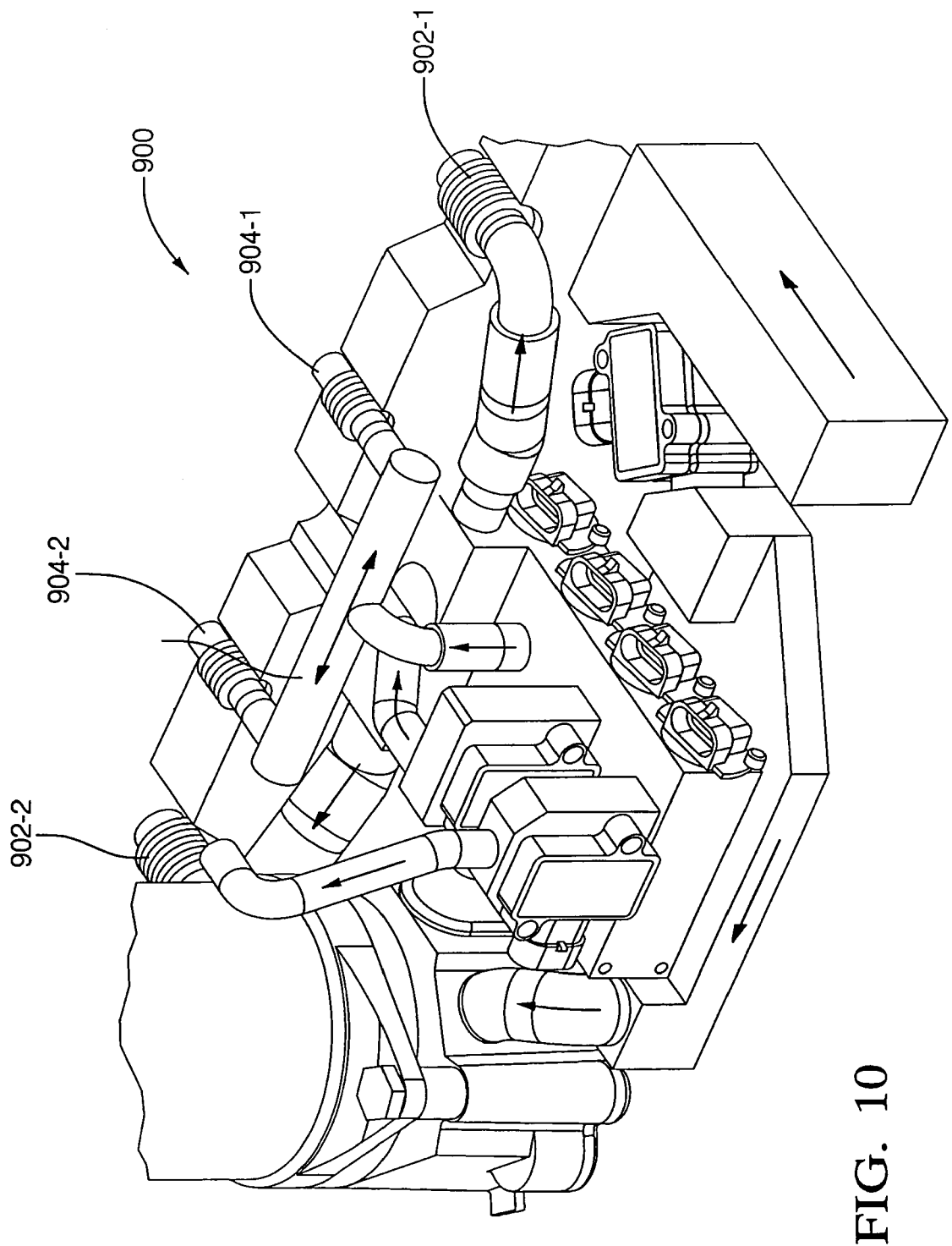
FIG. 10 is an isometric view from above of an air supply assembly for controllably providing air to the fuel cell assembly shown in FIGS. 8 and 9.

Referring to FIG. 8, a fuel cell assembly 400 in accordance with the invention comprises stack assembly 300 operatively mounted on an integrated fuel/air manifold assembly 500 which also supports first and second cathode air heat exchangers 600 and an integrated fuel reformer and waste energy recovery unit ("reforWER") 1100. Assembly 400 receives air from air supply system 900 (FIGS. 10–12) as described below and selectively preheats air going to the reformer. ReforWER 1100 reforms hydrocarbon fuel, such as gasoline, into reformate fuel gas comprising mostly hydrogen, carbon monoxide, and lower-molecular weight hydrocarbons, tempers the air and reformate entering the stacks, selectively burns fuel not consumed in the stacks, recovers heat energy generated in various internal processes which would otherwise be wasted, and exhausts spent air and water, all in order to efficiently generate DC electric potential across power leads 350,352 (not visible in FIG. 8).

Figure 9:
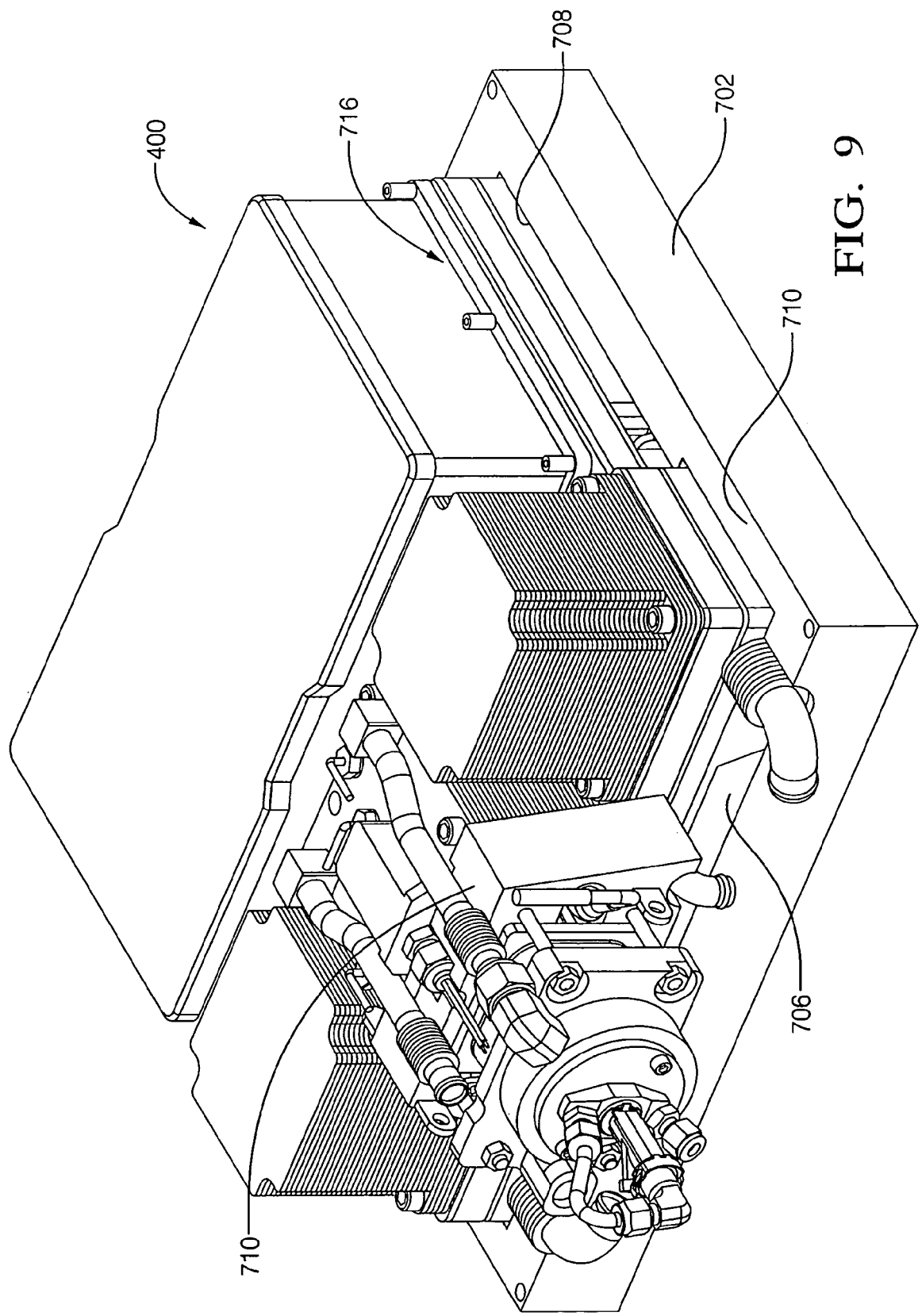
FIG. 9 is an isometric view from above, showing the fuel cell assembly of FIG. 8 mounted in the lower element of a thermal enclosure.
Figure 11:
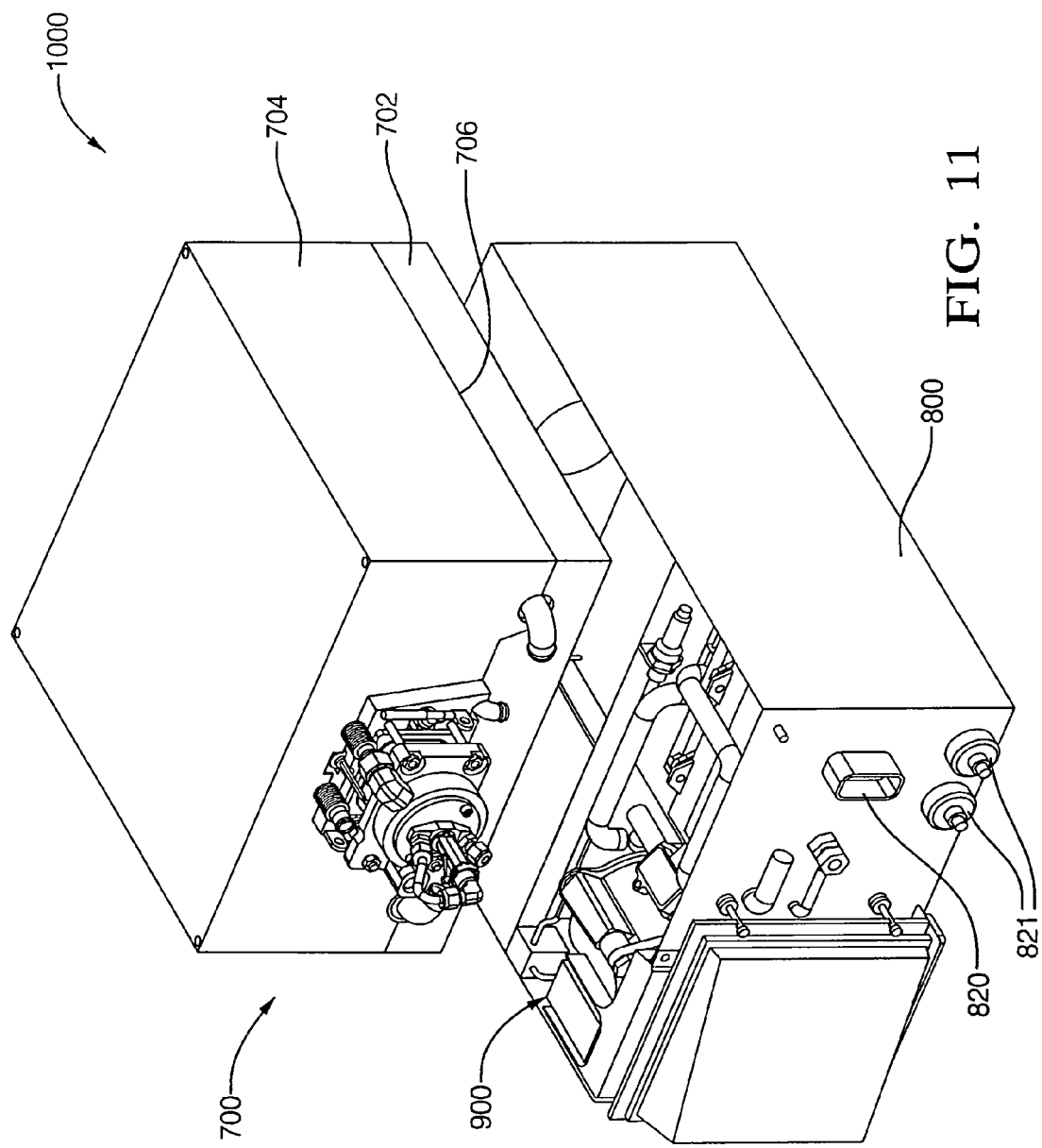
FIG. 11 is an exploded isometric view of a fuel cell system in accordance with the invention, showing the air supply assembly of FIG. 10 disposed in a structural enclosure, and showing the fuel cell assembly of FIG. 9 fully enclosed by both upper and lower elements of a thermal enclosure.

Referring to FIGS. 9 and 11, enclosure of the fuel cell assembly comprises two nested enclosures: a thermal enclosure 700 and a structural enclosure 800. Fuel cell assembly 400 is first disposed in a "clam-shell" type thermal enclosure 700, comprising a bottom portion 702 and a top portion 704, which in turn is disposed in a structural enclosure 800. The split line 706 between bottom portion 702 and top portion 704 is easily arranged such that all pipes, manifolds, shafts, power leads, etc., which need to pass between the "hot zone" 716 within the thermal enclosure and the "cool zone" 816 within the structural enclosure, do so in the middle of split line 706. This provides for easy assembly of the hot components into the thermal enclosure. First, all hot zone components, included in assembly 400, are nestled into in bottom portion 702, which may be provided with a conforming well 708 for securely holding and cushioning assembly 400, as shown in FIG. 9. The mating surface 710 of bottom portion 702, along split line 706, is configured as required to accommodate the lower halves of the components extending through enclosure 700. Top portion 704 is configured to matingly engage bottom portion 702. Top portion 704 is placed onto bottom portion 702 and may be sealed thereto along line 706 as desired. Thermal enclosure 700 may be formed of any suitable high-temperature high-efficiency insulating material, as is known in the insulating art, and may be a composite including a light-weight metal case. The range of suitable insulating materials is expanded by removing the constraint of overall structural integrity afforded by providing a separate structural enclosure 800.

Structural enclosure 800 preferably is fabricated from thicker metal, for example, to provide structural strength and a simple shape, such as a box with a removable lid, for ease of fabrication. Features such as brackets, studs, electrical connectors, studs, weld-nuts, air intake ducts, and exhaust ducts, for example, may be part of the structural enclosure for mounting internal components thereto and for connecting the system to external structures. Features for vibration and shock isolation (not shown) may also be provided with the enclosure.

Figure 12:
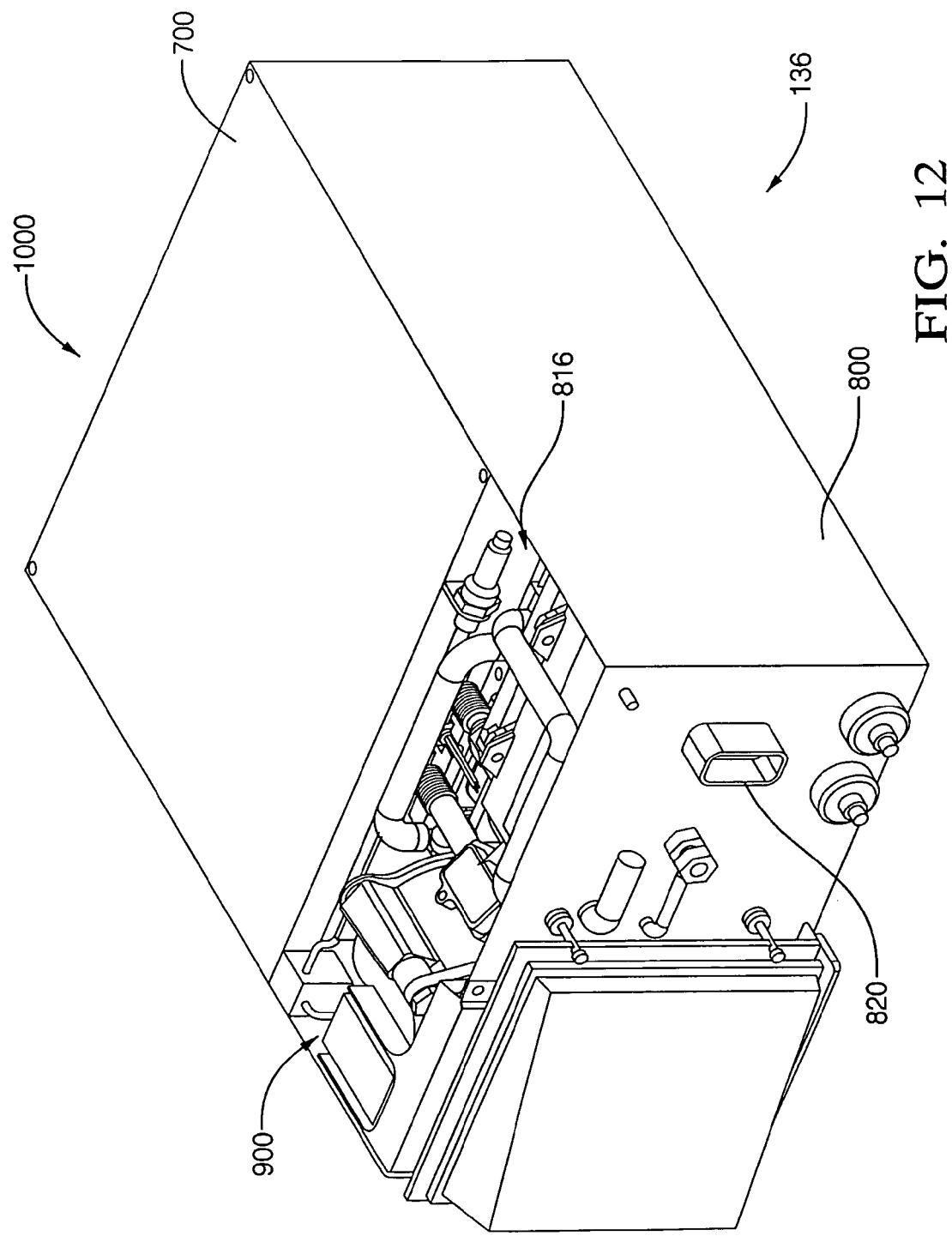
FIG. 12 is an isometric view from above of a fully assembled fuel cell system in accordance with the invention.

The air control assembly 900 is connected to elements of fuel cell assembly 400 projecting through split line 706, and assemblies 700,900 are then installed within structural enclosure 800, as shown in FIG. 12, to form a fuel cell system 1000 in accordance with the invention. Preferably, control system 200 (shown schematically in FIG. 2 as power conditioner 202, circuit protection I/O 204, drivers 206, and electronic control unit 208, but not visible in FIG. 12) is also installed onboard the system within cool zone 816 to minimize the number of discrete signals 210 which must be passed through enclosure 800 via connector 820. Note also that high current capacity power leads also pass through enclosure 800 via dual connectors 821.

Figure 13:
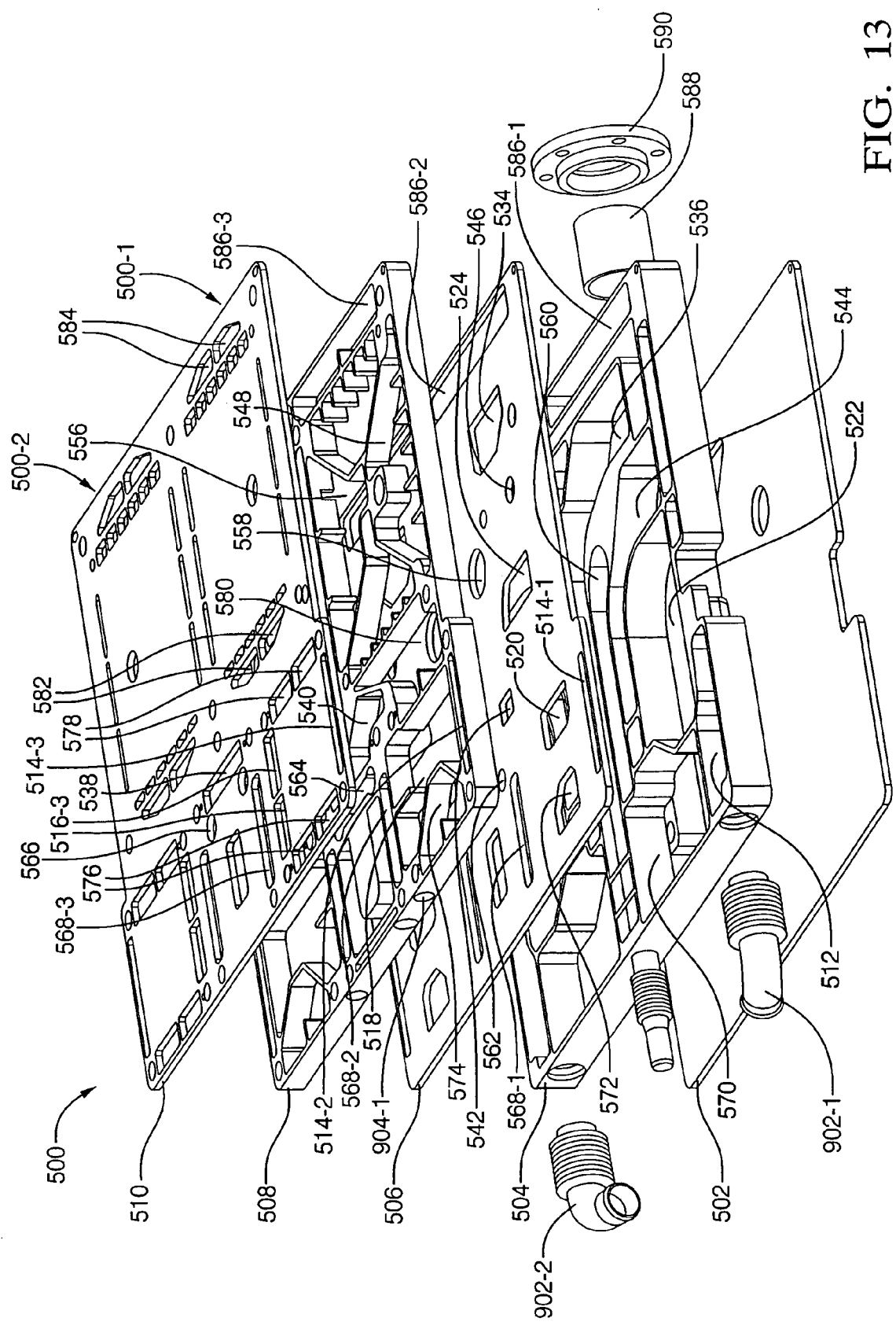
FIG. 13 is an exploded isometric view from the front, showing a multi-element basal manifold in accordance with the invention for distributing air and reformate fuel and exhaust products through and around the fuel cell stacks, as shown in FIG. 8.
Figure 14:
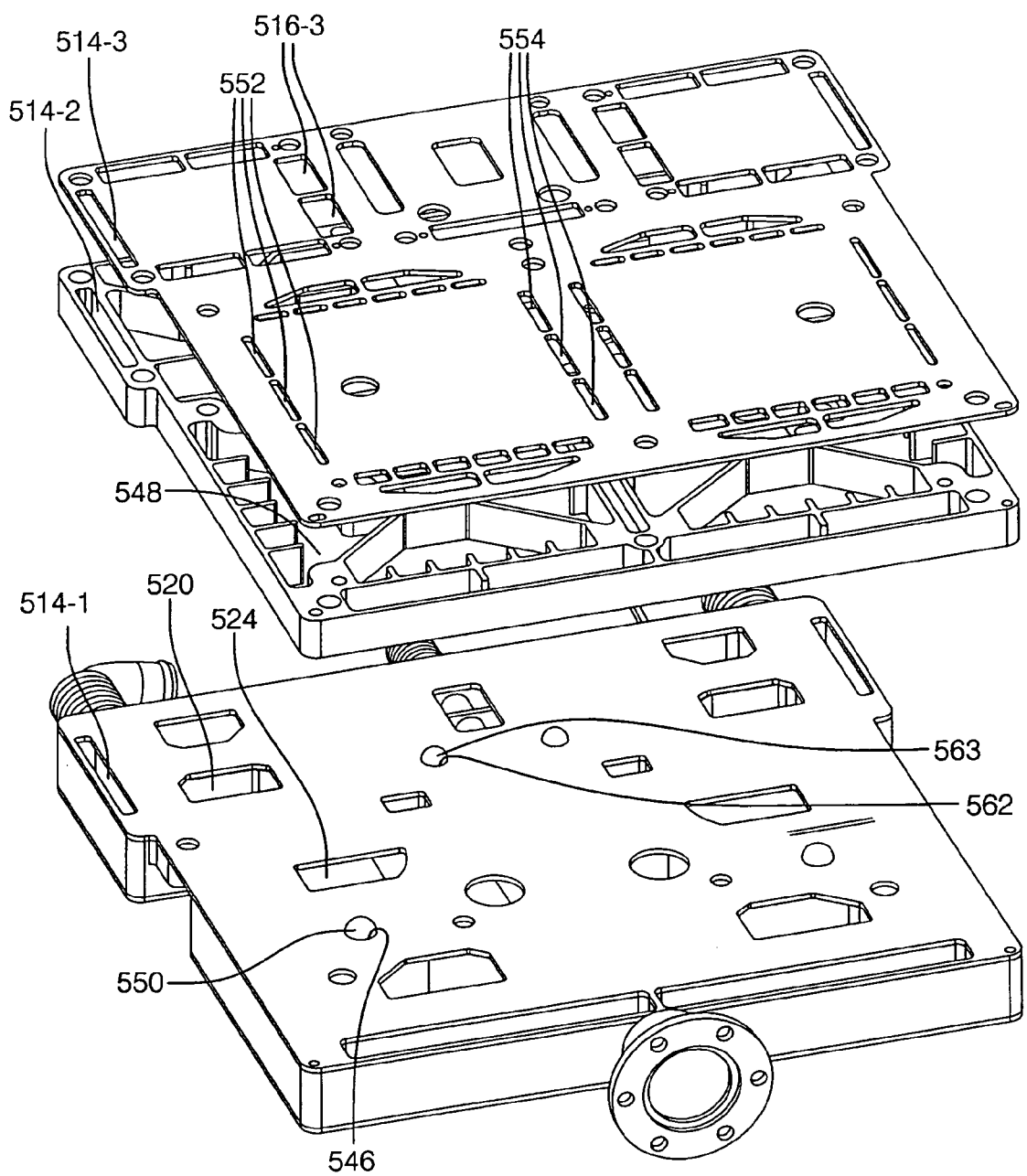
FIG. 14 is an isometric view from the rear, showing the manifold of FIG. 13 partially assembled.
Figure 15:
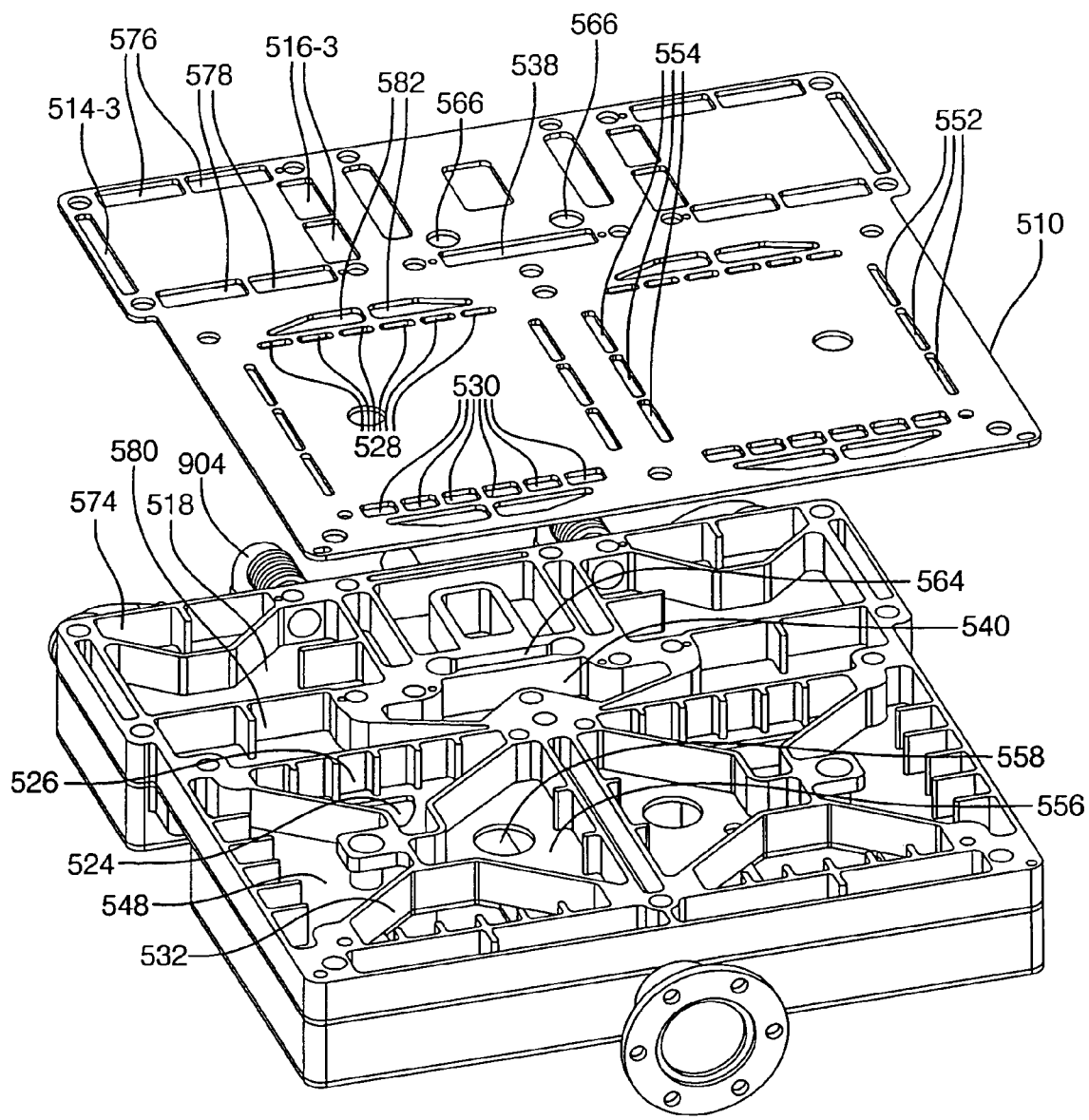
FIG. 15 is an isometric view from the rear, showing the manifold of FIG. 13 further assembled.

Referring to FIGS. 13 through 18, an integrated fuel/air manifold assembly 500 receives air via flexible bellows elements from air supply assembly 900 and reformed fuel from reformer assembly 1100 and conveys high temperature air, exhaust, and hydrogen-rich reformate fuel to and from the core components of the system. Basal manifold assembly 500 is shown in FIG. 13 as comprising a three-dimensional assembly of three perforated plates and two partitioned elements which are easily and inexpensively formed and which comprise a two-level network of passageways which allow for the mounting, close-coupling, and integration of critical fuel cell system components, including heat exchangers, combustors, fuel reformers, solid-oxide fuel cell stacks, check valves, threaded inserts, and catalyzed and non-catalyzed filters. Of course, while a five-component manifold is shown for simplicity, within the scope of the invention any two of the perforated plates obviously may be incorporated into the partitioned elements, through appropriate and obvious casting or moulding processes, such that the manifold comprises only three elements.

It should be noted that manifold 500 is actually two mirror image manifolds 500-1,500-2 sharing some common features, for example, cathode air return from the stacks. Thus, reformate fuel flows from reforWER unit 1100 in two parallel streams to stacks 344 and 346 and is returned to reforWER 1100 in two parallel streams. Likewise, cathode air flow from air supply assembly 900 is divided into two parallel streams and enters into each manifold 500-1,500-2 via mirror image couplings 902-1 and 902-2 (FIGS. 8–10 and 13). Fuel cell assembly 400 thus is seen to have its fuel cell stacks 344,346 connected in series electrically but serviced by gas flows in parallel.

For simplicity of presentation and discussion, except where functions are unique, the following construction and function is directed to manifold 500-1 but should be understood to be equally applicable to mirror-image manifold 500-2.

Figure 16:
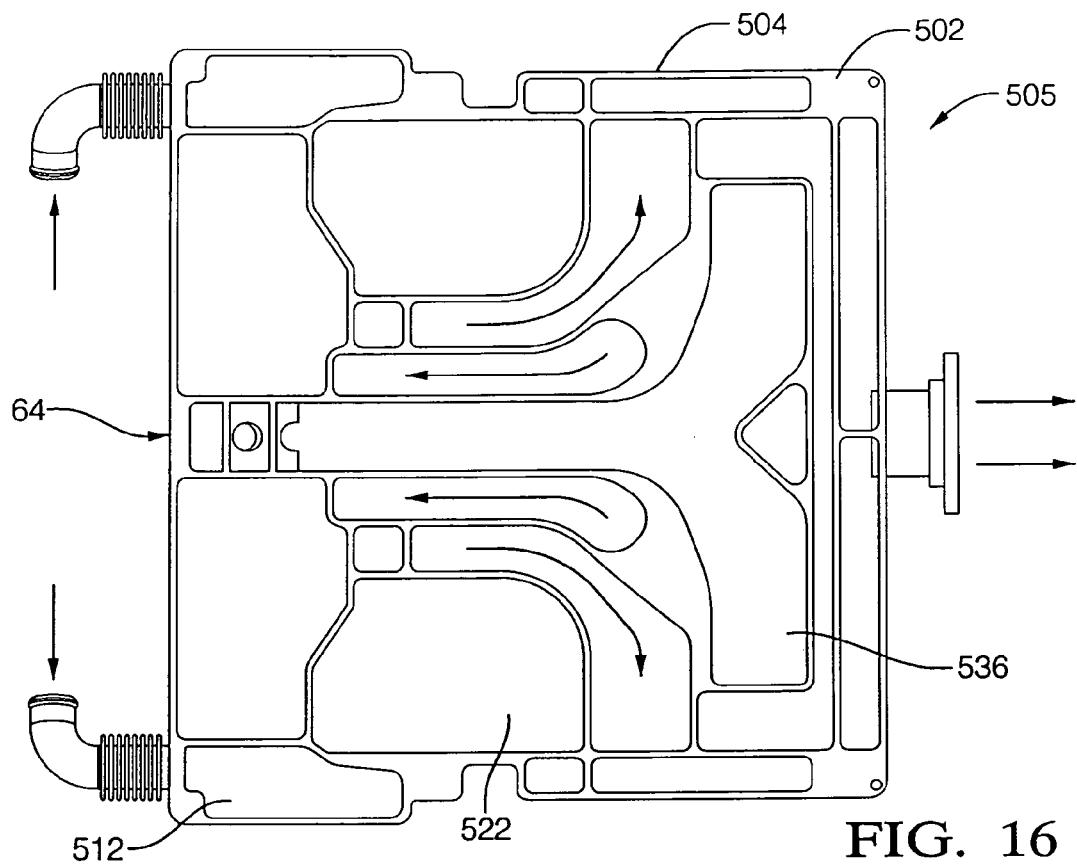
FIG. 16 is a plan view of the lower level of chambers formed by the lower two elements shown in FIG. 13.
Figure 17:
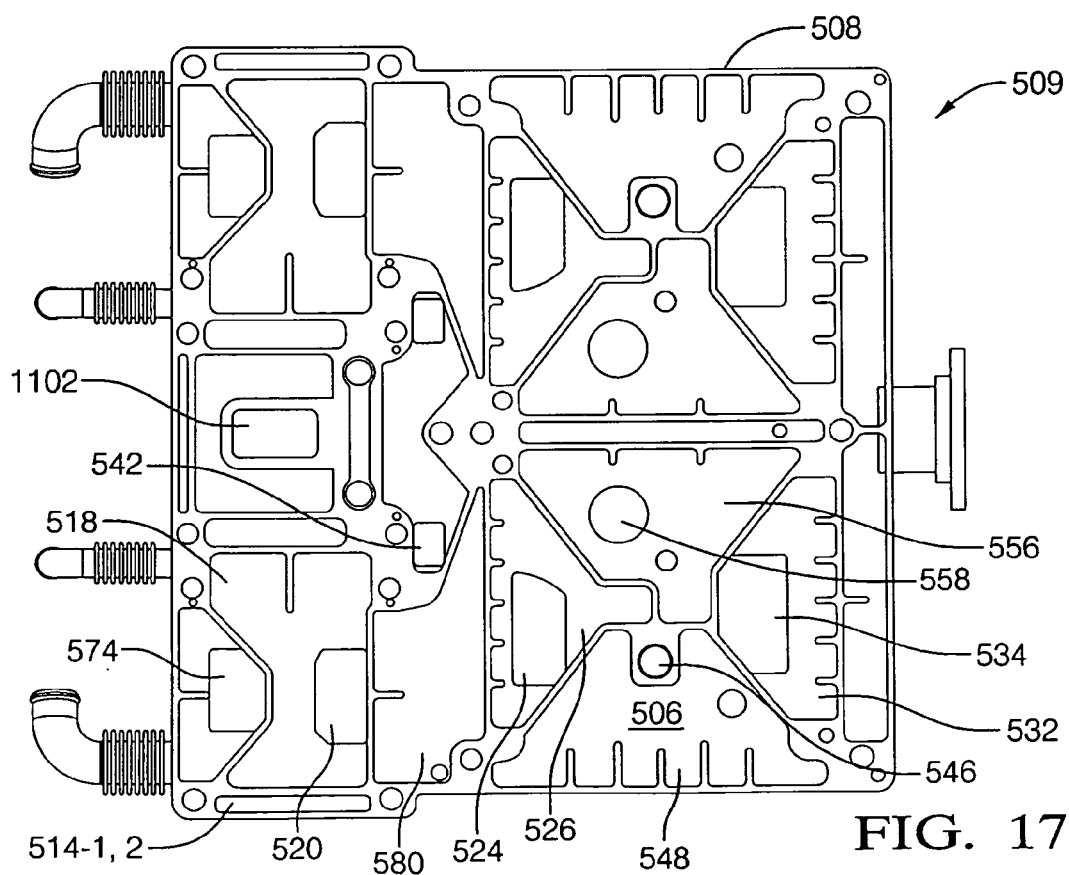
FIG. 17 is a plan view of the upper level of chambers formed by the third and fourth elements shown in FIG. 13.
Figure 18:
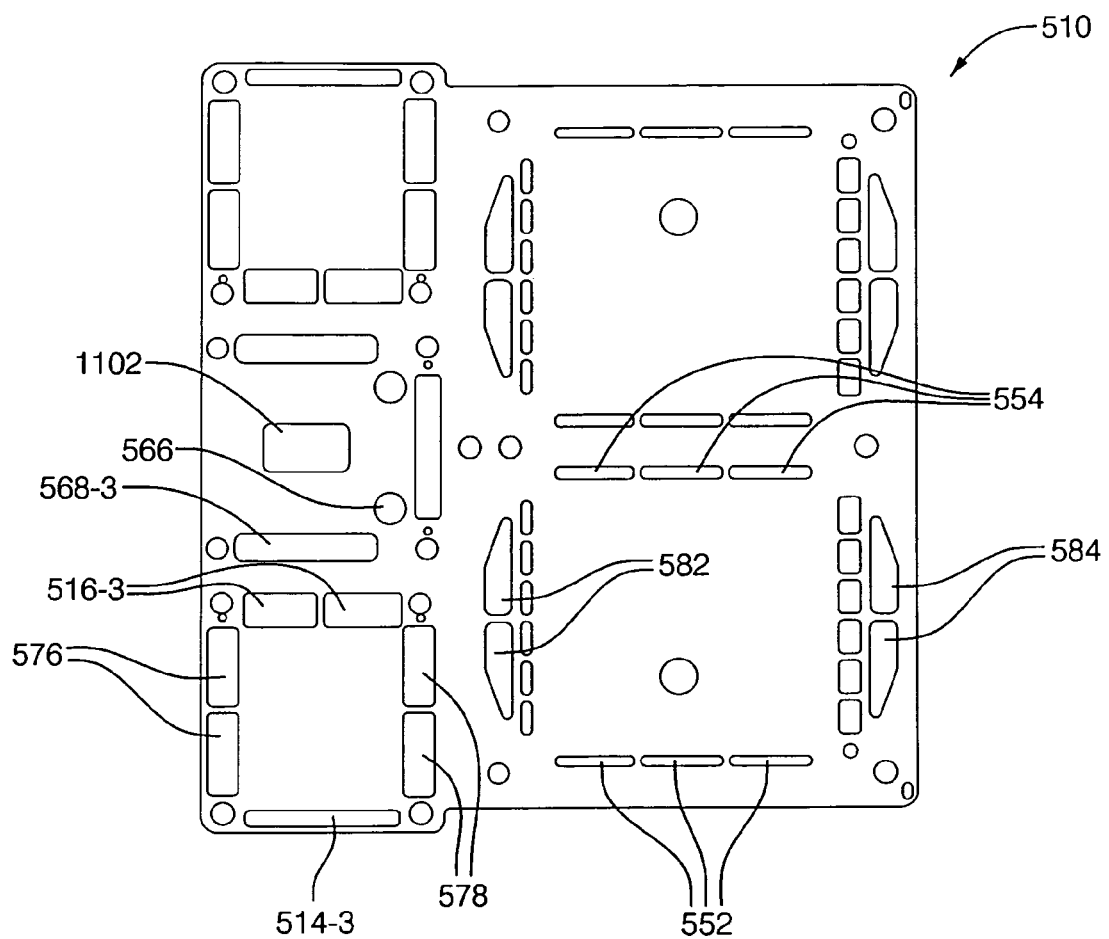
FIG. 18 is a plan view of the uppermost element shown in FIG. 13, showing the mounting surface for the apparatus shown in FIG. 8.

Bottom plate 502 is the base plate for the manifold and forms the bottom for various chambers formed by combination of plate 502 with lower partitioned element 504, defining a lower distribution element 505, as shown in FIG. 16. Intermediate plate 506 completes the chambers in element 504 and forms the bottom plate for upper partitioned element 508, defining an upper distribution element 509. Top plate 510 completes the chambers in element 508 and forms the mounting base for fuel cell assembly 300, heat exchangers 600, and reforWER unit 1100, as described above.

In operation, air enters a first bottom chamber 512 via coupling 902-1, flows upwards through slots 514-1,514-2, 514-3 into heat exchanger 600-1, through the heat exchanger conventionally where the air is heated as described below, downwards through slot 516-3 into a first upper chamber 518, thence through opening 520 in plate 506 into a second lower chamber 522. In chamber 518, the heated air is controllably mixed with cool air entering the chamber via bypass connection 904-1 from air supply assembly 900. The tempered air flows upwards from chamber 522 through opening 524 in plate 506 into a chamber 526 which defines a cathode supply plenum for supplying reaction and cooling air upwards through slotted openings 528 to the cathode air flow passages in stack 344. Spent air is returned from the cathodes via slotted openings 530 into a cathode return plenum 532 and flows downwards through an opening 534 in plate 506 into a common cathode air return runner 536 leading into a tail-gas combustor 1102 within reforWER 1100.

Hot reformate from reforWER 1100 enters manifold 500-1 via opening 538 in top plate 510 and flows into chamber 540, thence downwards through opening 542 into a feed runner 544, and upwards through opening 546 into a chamber 548 defining an anode supply plenum for stack 344.

Preferably, opening 546 defines a seat for a valve having a ball 550 (FIG. 14), preferably held in place by gravity, for allowing flow of reformate during operation but preventing flow of oxygen into the anodes when the system is shut down. Further, preferably, chamber 544 and/or 548 contains an oxygen-reactive material (not shown here but indicated as 134 in FIG. 2), such as nickel wool, through which reformate may easily pass but which can scavenge any oxygen passing by ball 550 on its way to the anodes.

Preferably, cathode supply chamber 522 and anode supply chamber 544 are configured to maximize the area of the common wall between them, such that chambers 522,544 define a co-flow heat exchanger which tends to decrease the temperature difference between the cathode supply air and the anode supply reformate.

From chamber 548, reformate flows upwards through slots 552 into the anode flow passages in stack 344. Spent reformate ("tail gas") flows downwards through slots 554 into an anode return plenum 556 and thence downwards through opening 558 into a reformate return runner 560. From runner 560, spent reformate flows upwards through opening 562 into elongate chamber 564 common with manifold 500-2 and thence through openings 566 into the tail-gas combustor in reforWER 1100. Preferably, opening 562 is also formed as a check valve seat like opening 546 for receiving a check ball 563 preferably held in place by gravity for preventing reverse flow of oxygen into the anodes when the system is shut down. Further, preferably, chamber 556 and/or 560, like chamber 548, contains an oxygen-reactive material (not shown here but indicated as 134 in FIG. 2), such as nickel wool, through which the tail gas may easily pass but which can scavenge any oxygen passing by ball 563 on its way to the anodes.

Burned tail gas from the combustor enters manifold 500-1 via slot 568-3 and flows via slots 568-2,568-1 into bottom chamber 570 and thence through opening 572 into chamber 574 which acts as a supply plenum for cathode air heat exchanger 600-1. Burned tail gas flows upward from chamber 574 through openings 576 and through heat exchanger 600-1, thus heating incoming cathode air, returning through openings 578 into chamber 580 and thence via openings 582 into a tempering jacket space 354 (FIG. 7) surrounding stack 344 between the fuel cells 311 and cover 342. The stack is thus tempered by the exhaust gas. The burned tail gas returns from jacket 354 via openings 584 into an exhaust plenum comprising openings 586-3,586-2,586-1 which is vented to the atmosphere by exhaust pipe 588 and pipe flange 590.

An SOFC system 1000 in accordance with the invention is especially useful as an auxiliary power unit (APU) for vehicles 136 (FIG. 12) on which the APU may be mounted, such as cars and trucks, boats and ships, and airplanes, wherein motive power is supplied by a conventional engine and the auxiliary electrical power needs are met by an SOFC system.

An SOFC assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system for generating electric power by combination of oxygen with hydrogen-containing fuel, comprising:
   a) a plurality of individual fuel cells organized into at least one fuel cell stack assembly including a plurality of cathodes and anodes;
   b) a reformer for reforming hydrocarbons to provide said fuel;
   c) an air supply system for supplying said oxygen in the form of air;
   d) an integrated fuel/air manifold for receiving said fuel from said reformer, conveying said fuel to said anodes, and returning said fuel as tail gas from said anodes, and for receiving said air from said air supply system, conveying said air to said cathodes, and returning said air from said cathodes;
   e) a structural enclosure for housing said fuel cells, said reformer, said air supply system, and said manifold;
   f) a control system for controlling operating parameters and conditions in said fuel cell system, wherein said control system includes a power conditioner, and wherein said control system also is disposed within said structural enclosure; and
   wherein said fuel cell system further comprises a thermal enclosure within said structural enclosure, said thermal enclosure enclosing said fuel cells, said manifold, and a portion of said reformer, and said control system being outside said thermal enclosure.

2. A fuel cell system in accordance with claim 1 wherein said fuel cells are solid-oxide fuel cells.

3. A fuel cell system in accordance with claim 1 wherein said control system is an electronic control system.

4. A fuel cell system in accordance with claim 1 wherein said structural enclosure is provided with a port for passage of electrical leads from said control system therethrough.

5. A fuel cell system in accordance with claim 1 wherein said system is mounted on a vehicle.

6. A fuel cell system in accordance with claim 5 wherein said vehicle is selected from the group consisting of car, truck, boat, and airplane.

7. A fuel cell system in accordance with claim 6 wherein said system is an auxiliary power unit for said vehicle.

8. An automotive vehicle, comprising a fuel cell system for generating auxiliary power for said vehicle, said system including:
   a plurality of individual fuel cells organized into at least one fuel cell stack assembly including a plurality of cathodes and anodes;
   a reformer for reforming hydrocarbons to provide fuel to said fuel cells;
   an air supply system for supplying air to said fuel cells;
   an integrated fuel/air manifold for receiving said fuel from said reformer, conveying said fuel to said anodes, and returning said fuel as tail gas from said anodes, and for receiving said air from said air supply system, conveying said air to said cathodes, and returning said air from said cathodes;
   a structural enclosure for housing said fuel cells, said reformer, said air supply system, and said manifold;
   a control system for controlling operating parameters and conditions in said fuel cell system, wherein said control system includes a power conditioner, and wherein said control system also is disposed within said structural enclosure; and
   wherein said fuel cell system further comprises a thermal enclosure within said structural enclosure, said thermal enclosure enclosing said fuel cells, said manifold, and a portion of said reformer, and said control system being outside said thermal enclosure.

9. A fuel cell system for generating electric power by combination of oxygen with hydrogen-containing fuel, comprising:
   a) a plurality of individual fuel cells organized into at least one fuel cell stack assembly including a plurality of cathodes and anodes;
   b) a reformer for reforming hydrocarbons to provide said fuel;
   c) an air supply system for supplying said oxygen in the form of air;

d) an integrated fuel/air manifold for receiving said fuel from said reformer, conveying said fuel to said anodes, and returning said fuel as tail gas from said anodes, and for receiving said air from said air supply system, conveying said air to said cathodes, and returning said air from said cathodes;

e) a structural enclosure for housing said fuel cells, said reformer, said air supply system, and said manifold;

f) a control system for controlling operating parameters and conditions in said fuel cell system, wherein said control system includes a circuit protection I/O, and wherein said control system also is disposed within said structural enclosure; and wherein said fuel cell system further comprises a thermal enclosure within said structural enclosure, said thermal enclosure enclosing said fuel cells, said manifold, and a portion of said reformer, and said control system being outside said thermal enclosure.

10. A fuel cell system in accordance with claim 9 wherein said fuel cells are solid-oxide fuel cells.

11. A fuel cell system in accordance with claim 9 wherein said control system is an electronic control system.

12. A fuel cell system in accordance with claim 9 wherein said structural enclosure is provided with a port for passage of electrical leads from said control system therethrough.

13. A fuel cell system in accordance with claim 9 wherein said system is mounted on a vehicle.

14. A fuel cell system in accordance with claim 13 wherein said vehicle is selected from the group consisting of car, truck, boat, and airplane.

15. A fuel cell system in accordance with claim 14 wherein said system is an auxiliary power unit for said vehicle.

* * * * *